(12) United States Patent
Nogami et al.

(10) Patent No.: US 11,308,352 B2
(45) Date of Patent: Apr. 19, 2022

(54) APPARATUS FOR PROCESSING LABELED DATA TO BE USED IN LEARNING OF DISCRIMINATOR, METHOD OF CONTROLLING THE APPARATUS, AND NON-TRANSITORY COMPUTER-READABLE RECORDING MEDIUM

(71) Applicant: CANON KABUSHIKI KAISHA, Tokyo (JP)

(72) Inventors: Atsushi Nogami, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 16/798,602

(22) Filed: Feb. 24, 2020

(65) Prior Publication Data

US 2020/0279132 A1 Sep. 3, 2020

(30) Foreign Application Priority Data

Feb. 28, 2019 (JP) .............................. JP2019-036394

(51) Int. Cl.
| | | |
|---|---|---|
| *G06K 9/62* | (2006.01) | |
| *G06K 9/46* | (2006.01) | |
| *G06K 9/00* | (2006.01) | |

(52) U.S. Cl.
CPC ....... *G06K 9/6234* (2013.01); *G06K 9/00671* (2013.01); *G06K 9/4604* (2013.01); *G06K 9/6218* (2013.01); *G06K 9/6256* (2013.01); *G06K 9/6263* (2013.01)

(58) Field of Classification Search
CPC . G06T 2207/30232; G06T 7/00; G06N 20/00; G06N 3/04
See application file for complete search history.

(56) References Cited

U.S. PATENT DOCUMENTS

| | | | | |
|---|---|---|---|---|
| 5,671,263 A | * | 9/1997 | Ching-Ming ......... | G01T 1/1648 378/8 |
| 7,050,618 B2 | * | 5/2006 | Belykh ..................... | G06T 5/10 382/132 |
| 7,150,559 B1 | * | 12/2006 | Heerdt .................. | G01J 5/0022 374/110 |
| 7,174,038 B2 | * | 2/2007 | Belykh ..................... | G06T 5/10 378/164 |
| 7,434,986 B2 | * | 10/2008 | Ignatowicz ........... | G01J 5/0003 374/4 |

(Continued)

FOREIGN PATENT DOCUMENTS

JP     2017-167834 A     9/2017

*Primary Examiner* — Yosef Kassa
(74) *Attorney, Agent, or Firm* — Venable LLP

(57) ABSTRACT

An apparatus comprising: an obtaining unit configured to obtain target data as a result of discrimination of each portion of input data performed by a discriminator having learned in advance by using existing labeled data; a setting unit configured to set each portion of the target data, which is effective for additional learning of the discriminator, as local data; a determining unit configured to determine not less than one partial region of the target data, which accepts labeling by a user, based on a distribution of the set local data in the target data; and a display control unit configured to cause a display unit to display the determined not less than one partial region.

19 Claims, 12 Drawing Sheets

(56) References Cited

U.S. PATENT DOCUMENTS

| | | | |
|---|---|---|---|
| 8,285,056 B2* | 10/2012 | Taguchi | G06T 7/001 382/203 |
| 8,405,836 B2* | 3/2013 | Yablon | G01B 9/0209 356/517 |
| 8,825,131 B2* | 9/2014 | Peacock, III | A61B 5/748 600/410 |
| 9,589,210 B1* | 3/2017 | Estrada | G06T 7/74 |
| 9,668,699 B2* | 6/2017 | Georgescu | G06K 9/6255 |
| 2007/0208678 A1 | 9/2007 | Matsugu | |
| 2007/0270664 A1 | 11/2007 | Ishii et al. | |
| 2008/0211904 A1 | 9/2008 | Kato et al. | |
| 2010/0079263 A1 | 4/2010 | Anabuki et al. | |
| 2011/0037984 A1 | 2/2011 | Yoshikawa et al. | |
| 2011/0206237 A1 | 8/2011 | Saruta et al. | |
| 2013/0135087 A1 | 5/2013 | Anabuki et al. | |
| 2013/0286047 A1 | 10/2013 | Katano et al. | |

\* cited by examiner

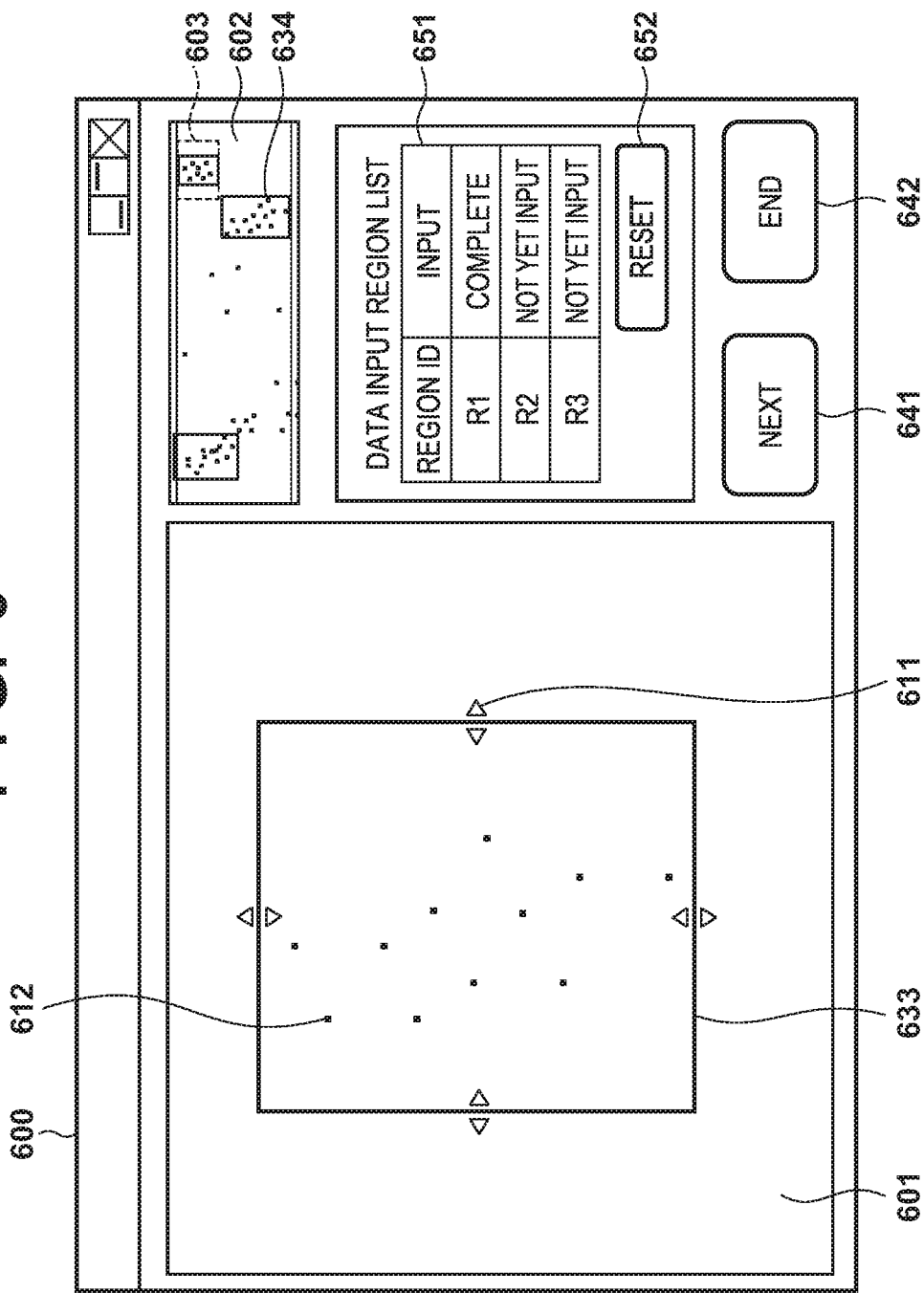

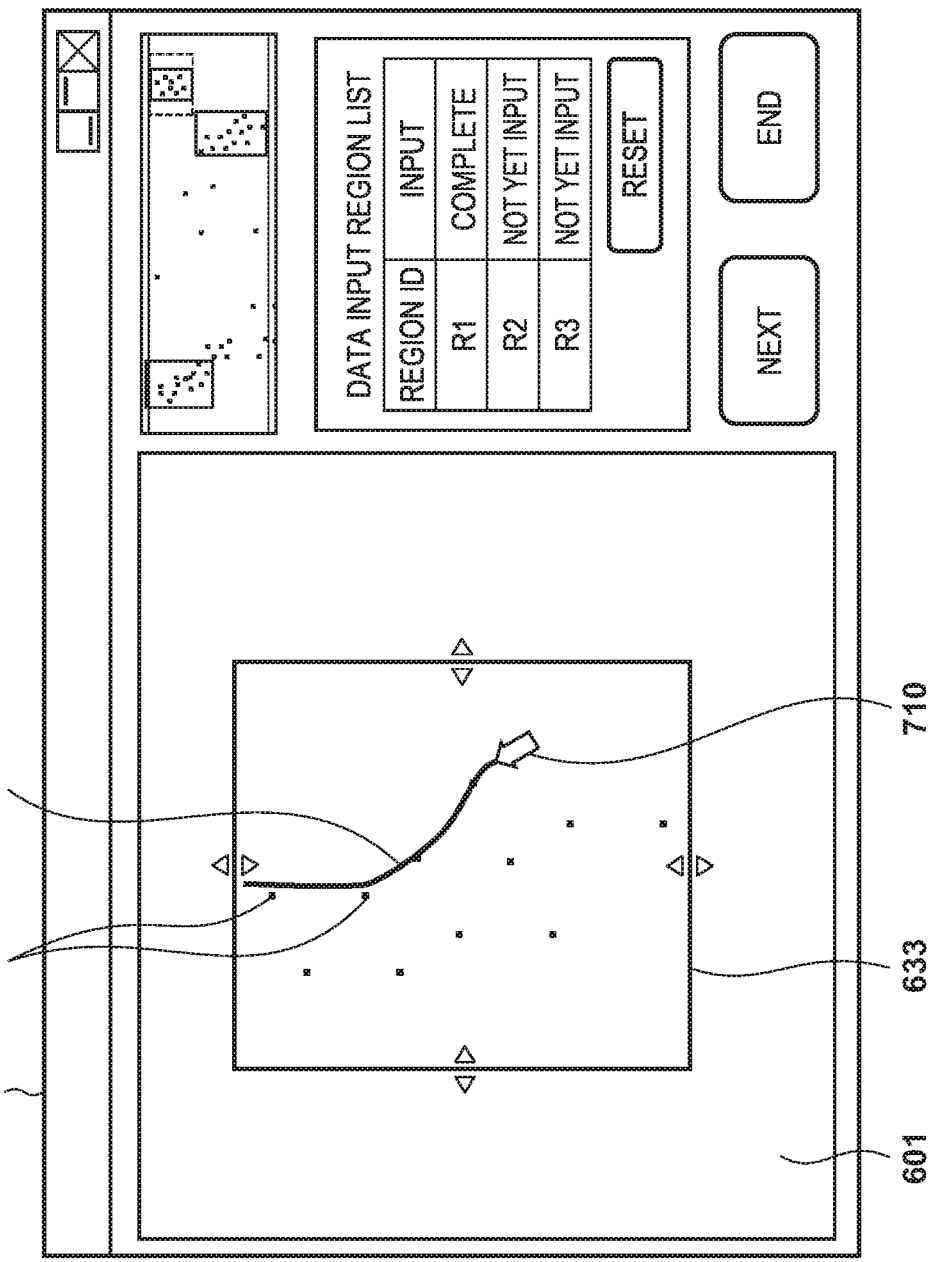

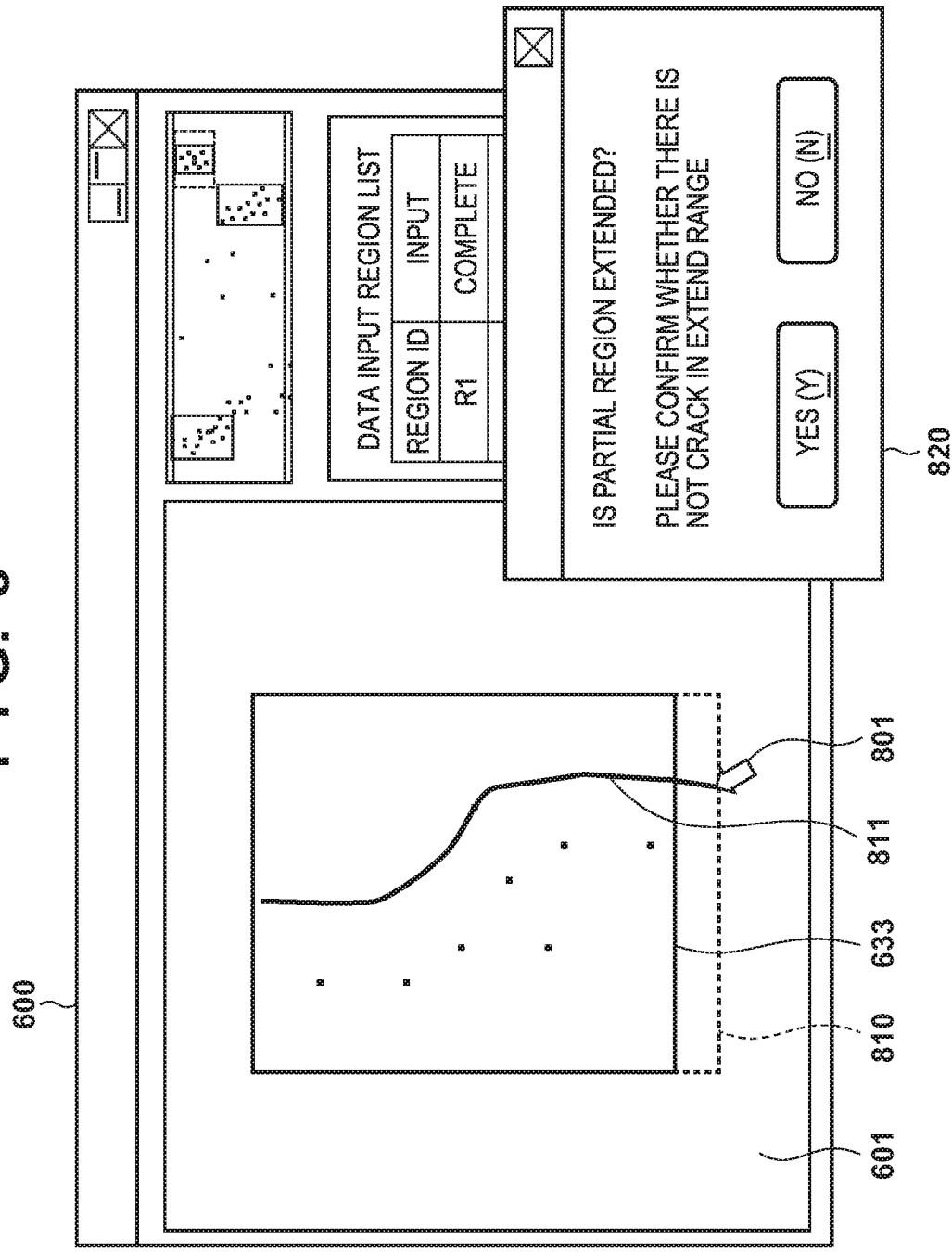

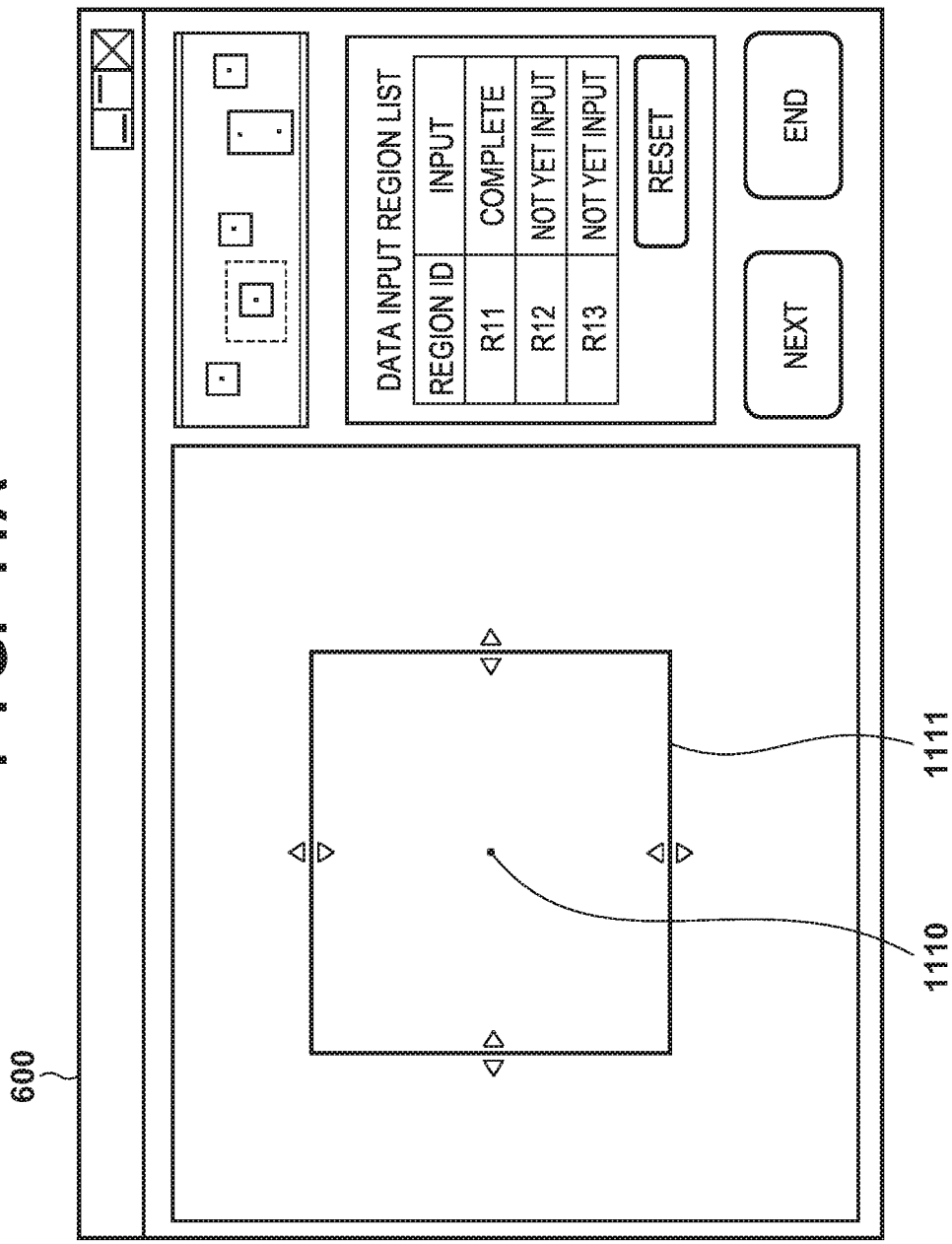

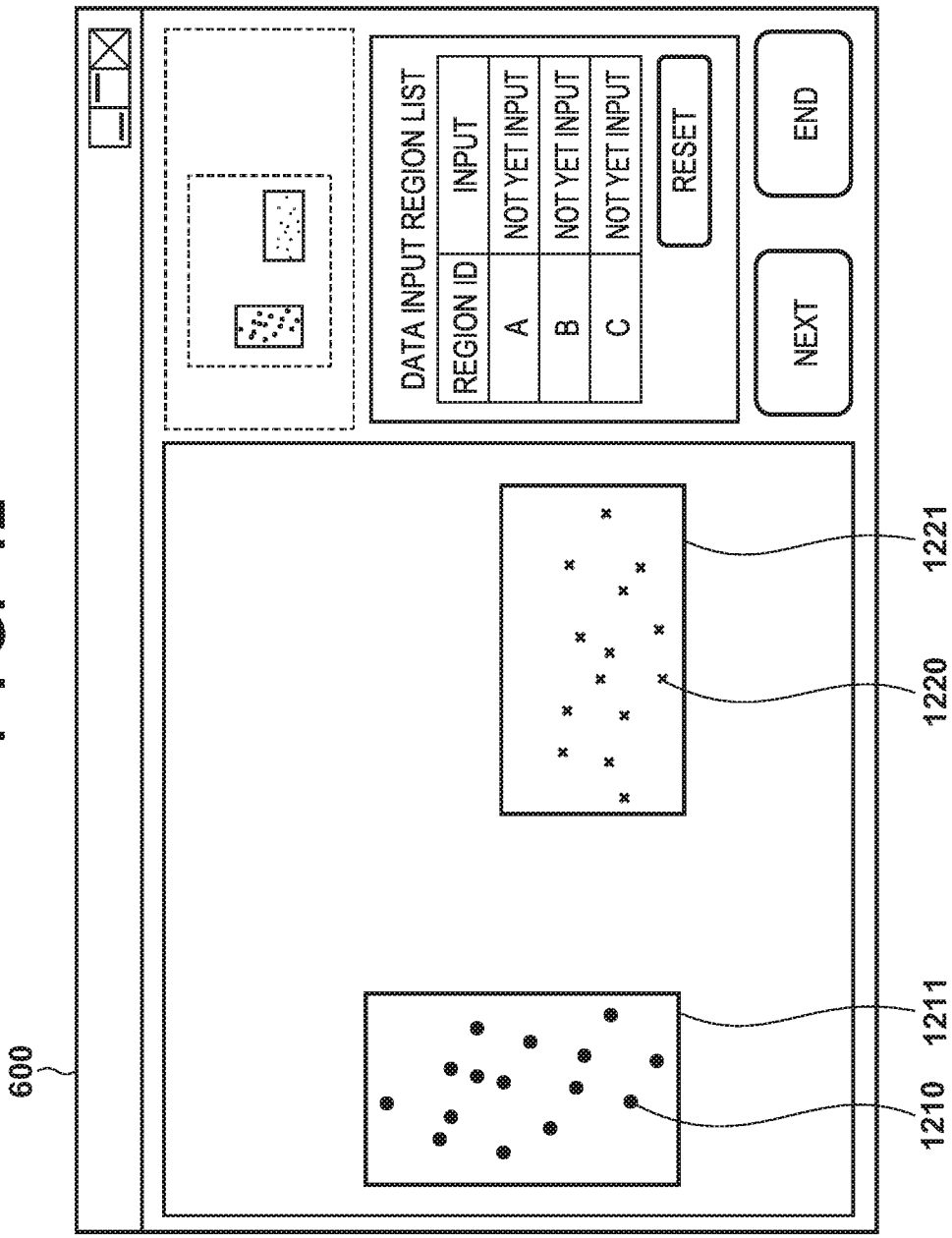

APPARATUS FOR PROCESSING LABELED DATA TO BE USED IN LEARNING OF DISCRIMINATOR, METHOD OF CONTROLLING THE APPARATUS, AND NON-TRANSITORY COMPUTER-READABLE RECORDING MEDIUM

BACKGROUND OF THE INVENTION

Field of the Invention

The present invention relates to the generation of labeled data to be used in learning of a discriminator.

Description of the Related Art

Labeled data is necessary to perform learning of a discriminator by machine learning. This labeled data can also be called correct answer data indicating a correct answer of a discrimination result obtained by a discriminator, or teacher data for learning. A work for preparing the labeled data requires a high work cost, so a technique for reducing this cost has been examined.

Japanese Patent Laid-Open No. 2017-167834 discloses a technique that selects data effective for learning from unlabeled data by using a discriminator having learned with the existing labeled data. This method discriminates unlabeled data by using a learned discriminator, and selects data discriminated near the discrimination boundary as data effective for learning. This data near the discrimination boundary is data which the existing discriminators cannot easily discriminate. Effective learning can be performed by labeling this data near the discrimination boundary.

In this technique described in Japanese Patent Laid-Open No. 2017-167834, however, a region effective for learning is not taken into consideration at all, and this makes efficient labeling difficult.

SUMMARY OF THE INVENTION

According to one aspect of the present invention, there is provided an apparatus comprising: an obtaining unit configured to obtain target data as a result of discrimination of each portion of input data performed by a discriminator having learned in advance by using existing labeled data; a setting unit configured to set each portion of the target data, which is effective for additional learning of the discriminator, as local data; a determining unit configured to determine not less than one partial region of the target data, which accepts labeling by a user, based on a distribution of the set local data in the target data; and a display control unit configured to cause a display unit to display the determined not less than one partial region.

Further features of the present invention will become apparent from the following description of exemplary embodiments (with reference to the attached drawings).

BRIEF DESCRIPTION OF THE DRAWINGS

FIG. 6 is a view for explaining a display unit and a label input unit according to the first embodiment;

FIG. 7 is a view for explaining input of a crack label according to the first embodiment;

FIG. 8 is a view for explaining automatic range extension of a partial region according to the first embodiment;

FIG. 11A is a view for explaining local data and a partial region according to the fourth embodiment;

FIG. 12 is a view for explaining local data and partial regions according to the fifth embodiment.

DESCRIPTION OF THE EMBODIMENTS

Figure 1:
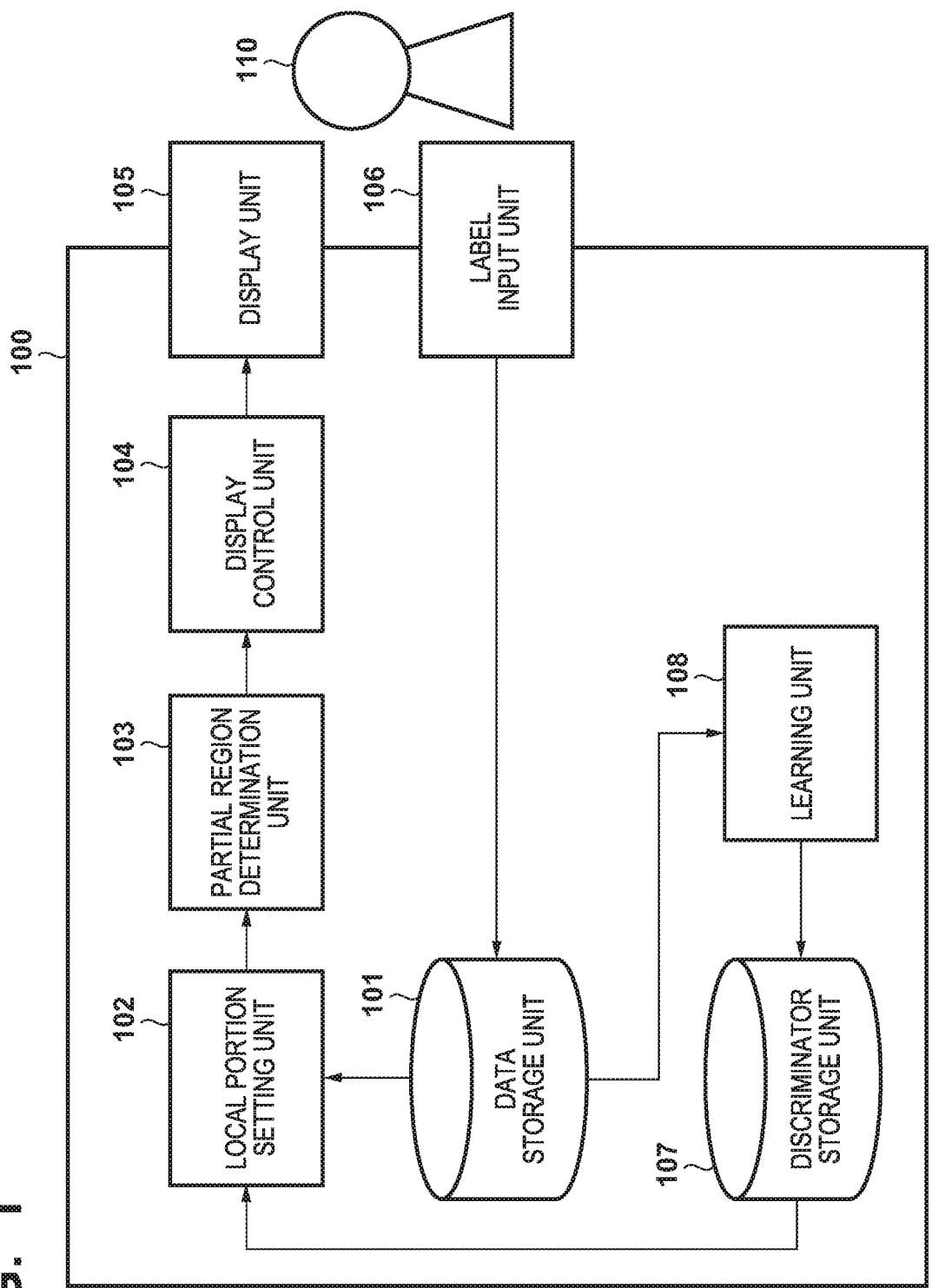
FIG. 1 is a view showing an arrangement example of an information processing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

In this embodiment, a partial region effective for learning is selected from unlabeled data and presented as labeling target data. In this embodiment, local data requiring labeling is determined based on a given criterion, a partial region containing the local data and having a range wider than the local data is determined, and labeling is requested for this partial region.

In this embodiment, data as a target of labeling is an image. Also, local data is a pixel of the image, and a partial region is a partial image region containing the pixel as the local data. A partial region like this is selected as labeling target data, and a label inputter (to be referred to as a user hereinafter) labels each pixel in the partial region.

This embodiment forms labeled data (teacher data) for performing learning of a discriminator that discriminates whether a target exists for each pixel of an image. For example, in an appearance test to be conducted on a product in a production process, learning is performed on a discriminator for detecting a scratch or a defect of the product. Such a discriminator is created by learning a discriminator for detecting a scratch or a defect for each pixel by using a label indicating the position of a scratch or defect having an arbitrary shape. As another example, in inspection of a concrete structure such as a bridge, a dam, a tunnel, or a building, a defect on a concrete wall surface is detected. Examples of the defect to be detected are a crack of the concrete, water leakage, efflorescence, and a rust fluid. These defects appear as arbitrary shapes. A discriminator for inspecting a concrete wall surface performs learning by using data labeled to a pixel of a detect in an image of the concrete wall surface. When detecting a defect, the discriminator discriminates whether a defect exists for each pixel.

In the first embodiment, an embodiment for forming labeled data for learning of a discriminator that detects a crack from a concrete wall surface image will be explained.

<Arrangement of Information Processing Apparatus>

First, an arrangement example of an information processing apparatus according to an embodiment will be explained below with reference to FIG. 1. An information processing apparatus 100 and a related arrangement can be implemented by executing software (a program) obtained from a network or various information recording media by using a computer including a CPU, a memory, a storage device, an input/output device, a bus, a display device, and the like. Note that as the computer, it is possible to use a general-purpose computer or hardware designed to be optimum for the software.

The information processing apparatus 100 includes a data storage unit 101, a local portion setting unit 102, a partial region determination unit 103, a display control unit 104, a display unit 105, a label input unit 106, a discriminator storage unit 107, and a learning unit 108. A user 110 labels a presented partial region by using the display unit 105 and the label input unit 106. Note that these constituent elements are not always essential elements of this embodiment. For example, the display unit 105 and the label input unit 106 may also be installed outside the information processing apparatus 100. In addition, it is also possible to execute a part of processing by an external apparatus, and supply the result to the information processing apparatus 100.

The data storage unit 101 is a storage for storing an unlabeled image and a labeled image, and is a storage device such as a hard disk. Images of concrete wall surfaces are stored in the data storage unit 101 according to this embodiment. In inspection of a concrete wall surface, a high-resolution image in which 1 mm of a concrete wall surface is recorded in one pixel is necessary to observe a crack having a width of 1 mm or less. Accordingly, an inspection image of a 10 m×10 m concrete wall surface is a large-sized image having 10,000 pixels×10,000 pixels. The number of pixels of an image having this size exceeds that of an ordinary camera. However, a high-resolution image for inspection can be formed by a method of, for example, connecting images obtained by imaging different positions of a concrete wall surface.

Figure 2:
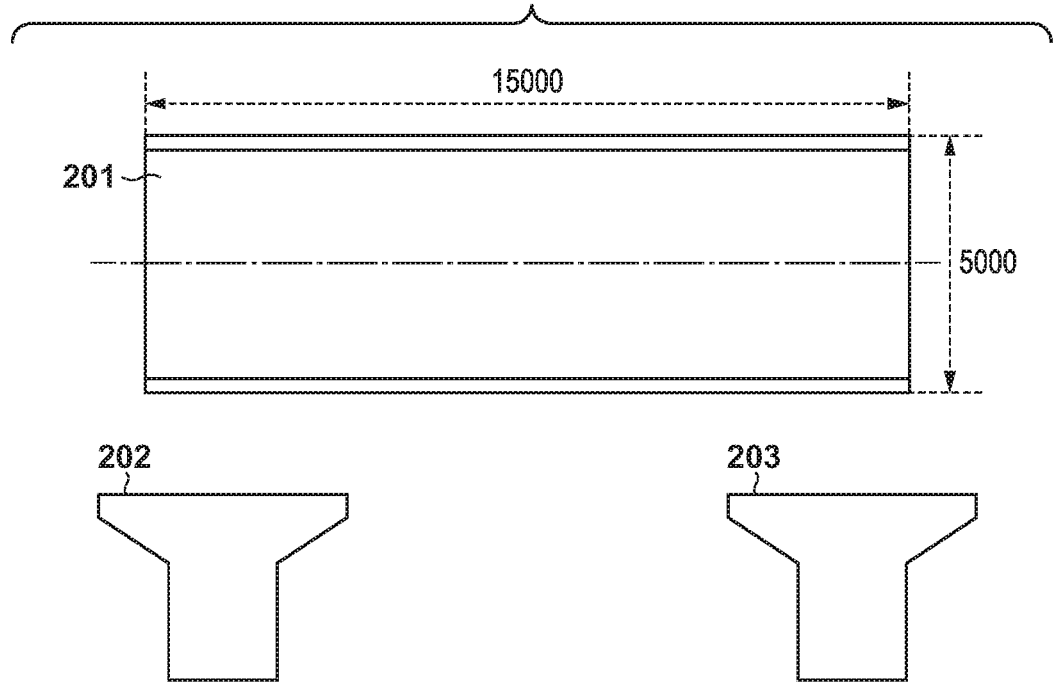
FIG. 2 is a view for explaining labeling target data according to the first embodiment.

An image of this embodiment will be explained in more detail below with reference to FIG. 2. FIG. 2 shows data obtained by pasting a captured image on a plan view of a bridge. This plan view of FIG. 2 shows a slab 201 and piers 202 and 203 of the bridge, and it is assumed that images obtained by imaging the concrete wall surfaces of these members are pasted on them. For example, if the inspection image has a resolution of 1 mm=1 pixel, an image having 15,000 pixels×5,000 pixels is pasted on the slab 201 having a size of 15 m×5 m. To perform learning of a discriminator for detecting a crack, it is necessary to give a label indicating whether each pixel of the image as shown in FIG. 2 is a crack. However, giving crack labels to all pixels in the large image as shown in FIG. 2 requires a very high work cost. In this embodiment, a partial image effective for learning is selected as a labeling target image from an image like this.

The local portion setting unit 102 loads a labeling target image from the data storage unit 101, determines a portion effective for learning in the labeling target image data, and sets the portion as local data.

The partial region determination unit 103 forms partial region candidates based on the spatial distribution of the set local data. Then, the partial region determination unit 103 calculates the labeling priority of each partial region candidate, and selectively determines a partial region from the partial region candidates based on the priorities.

The display control unit 104 controls the display unit 105 to display the set partial region. The display unit 105 is a display such as an LCD. The label input unit 106 is an input device such as a keyboard, a mouse, or a touch panel display, and accepts input of labeling with respect to the partial region displayed on the display unit 105.

The discriminator storage unit 107 stores a learned discriminator. The learning unit 108 performs learning of a discriminator for crack detection or the like by using an image and label data stored in the data storage unit 101, and stores the discriminator as a result of learning in the discriminator storage unit 107.

<Processing>

Figure 3:
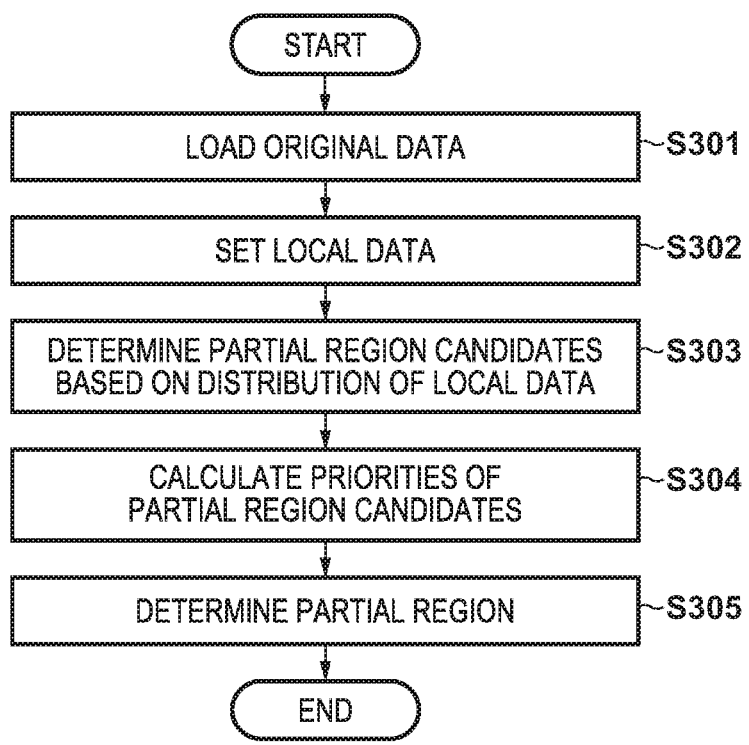
FIG. 3 is a flowchart showing a procedure to be performed by the information processing apparatus according to the embodiment.

FIG. 3 is a flowchart showing the procedure of processing to be performed by the information processing apparatus according to this embodiment.

<Step S301>

In step S301, the local portion setting unit 102 loads a labeling target image from the data storage unit 101. In this embodiment, an embodiment of loading the image of one bridge shown in FIG. 2 will be explained. However, image data to be loaded in step S301 is not limited to one structure. For example, images of a plurality of structures may also be loaded. It is also possible to load a partial image of a structure, for example, load only an image of the slab 201 of the bridge shown in FIG. 2.

<Step S302>

In step S302, the local portion setting unit 102 determines a portion effective for learning in the labeling target image data, and sets the portion as local data. Note that the portion effective for learning in the labeling target image data is a portion having a high labeling work efficiency when improving the performance of a discriminator by performing additional learning on the discriminator by using data labeled to that portion. That is, a portion that potentially improves the discrimination ability of a discriminator more with a less labeling work is the portion effective for learning. An example is a partial image having a feature different from the existing labeled data (already learned learning data). When performing additional learning by using the same number of data having high similarities to the existing labeled data and data having low similarities to the existing labeled data, the data having low similarities to the existing labeled data more contributes to improving the discrimination ability. In this case, a portion of labeling target image data, which has low similarity to the existing labeled data, is the portion effective for learning.

As the first method, a method of selecting a pixel that is hardly discriminated by a prelearned discriminator will be explained. Assume that in this method, a discriminator for detecting a crack has prelearned. This prelearned discriminator learns by the existing labeled data. The existing labeled data is data obtained by giving a crack label to a pixel of an image different from the image data loaded in step S301, and is data obtained by giving a crack label to an image of another structure in advance. This learned discriminator having learned by the existing labeled data is stored in the discriminator storage unit 107. In the first method, a pixel which this learned discriminator hardly discriminates is determined as a pixel effective for learning, and set as local data.

To set this local data, the local portion setting unit 102 first loads the learned discriminator from the discriminator storage unit 107, and executes crack detection on image data by using the learned discriminator. Then, the learned discriminator determines a hard-to-discriminate pixel by using the detection result. Since the discriminator outputs a crack detection result for each pixel of the image, a hard-to-discriminate pixel can be determined by selecting a pixel having a discrimination result near the discrimination boundary. More specifically, assuming that the discriminator outputs the crack probability of each pixel within the range of 0 to 1, a pixel for which the output is close to 0.5 is a hard-to-discriminate pixel. In this case, it is determined that there is no crack if the output from the discriminator is close to 0, and that there is a crack if the output is close to 1. Accordingly, a pixel indicating a crack probability within a predetermined value range near 0.5 is set as local data.

As the second method, a method of using a plurality of learned discriminators will be explained. Assume that in this method, a plurality of different discriminators have pre-learned and are stored in the discriminator storage unit 107. The plurality of different discriminators are, for example, discriminators having learned by using different learning data sets. The different learning data sets include concrete wall surface images of different structures and crack labels. The discriminators having learned by using the different learning data sets have different detection characteristics. The local portion setting unit 102 loads the plurality of learned models described above from the discriminator storage unit 107, and performs a crack detection process on the image data by using the plurality of learned models. Consequently, a plurality of detection process results are obtained. In the second method, a pixel having a large detection result variation is determined as a portion that is hard to discriminate and effective for learning, and set as local data. Various methods can be used to determine a detection result variation. For example, it is possible to select a pixel having a discrimination result variation by obtaining an entropy $h_n$ of a pixel n as follows:

$$h_n = -\sum_i \frac{V(y_i)}{C} \log\left(\frac{V(y_i)}{C}\right) \quad (1)$$

where i represents the number of discrimination classes. In crack detection, 2-class discrimination of discriminating whether each pixel is a crack is performed, so i=2. $V(y_i)$ indicates the number of discriminators having discriminated that the pixel n has a label $y_i$, and C is the number of discriminators. For a pixel having a large entropy $h_n$, the discrimination result variation of the plurality of discriminators is large. In the second method, a pixel for which the entropy $h_n$ calculated as described above has a predetermined value or more is set as local data. The local data can be set by the following method.

Figure 4A:
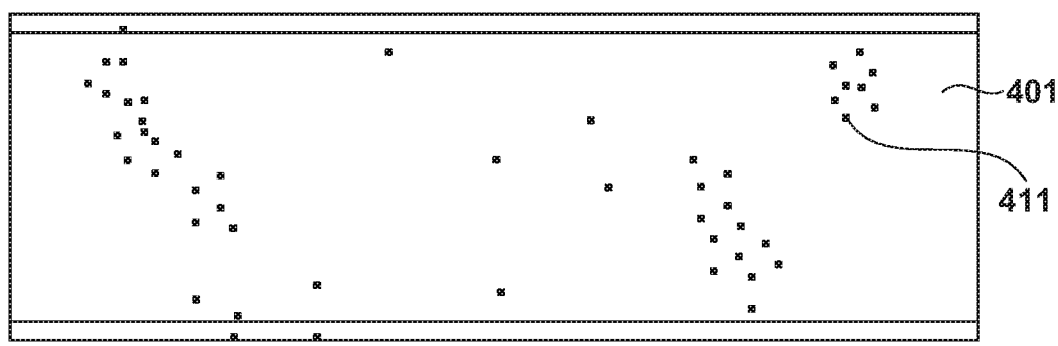
FIG. 4A is a view for explaining local data and partial regions according to the first embodiment.

FIG. 4A shows the way a pixel in an image 401 is selected as local data by the above method. The image 401 is an image of the slab 201 shown in FIG. 2, and points such as a pixel 411 indicate pixels selected as local data. Thus, a plurality of local data can be selected from the image 401. This is so because in the first method, a plurality of pixels exist within a predetermined range from the discrimination plane of the discrimination results, and, in the second method, a plurality of pixels for which the entropy has a predetermined value or more exist. On the other hand, if there is no pixel determined as local data (if there is no hard-to-discriminate pixel), it is possible to determine that there is no labeling target data, and terminate the whole process.

Also, these local data setting methods can set importance to each local data. For example, in the first method, the importance of each local data can be set based on the distance from the discrimination plane. In this case, the setting is so performed that the importance increases as the distance from the discrimination plane decreases. In the second method, the value of the entropy of each local data can directly be set as the importance. A method of using the importance of local data will be described later. In step S302, pixel coordinates X and importances G of N local data are calculated by the above processing. These values are represented as follows:

$$X=\{(u_1,v_1),(u_2,v_2),\ldots,(u_n,v_n),\ldots,(u_N,v_N)\} \quad (2)$$

$$G=\{g_1,g_2,\ldots,g_n,\ldots,g_N\} \quad (3)$$

where $(u_n, v_n)$ indicates the image coordinates of the nth local data, and $g_n$ is the importance of the nth local data.

<Step S303>

Figure 4B:
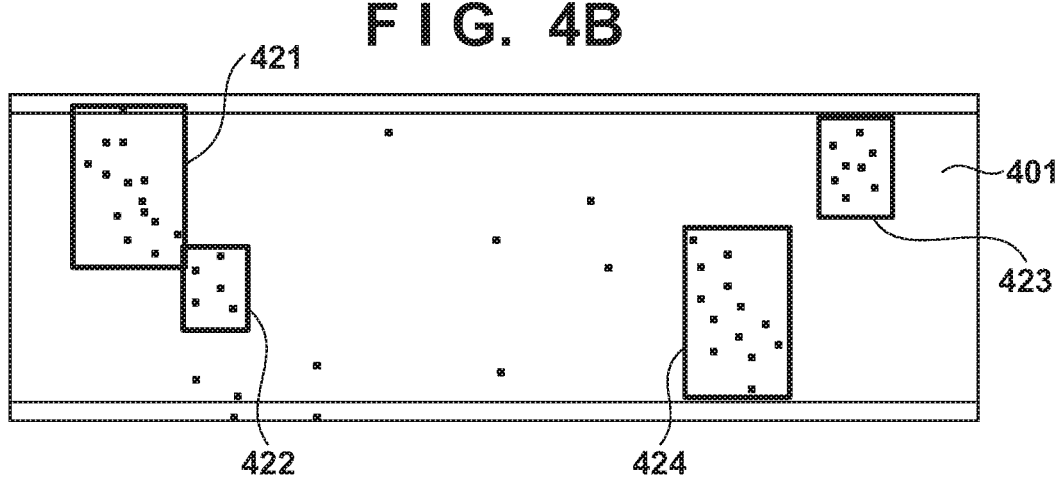
FIG. 4B is a view for explaining local data and partial regions according to the first embodiment.

In step S303, the partial region determination unit 103 forms partial region candidates based on the spatial distribution of local data. FIG. 4B shows the way partial region candidates 421, 422, 423, and 424 are formed from the local data in FIG. 4A. A method of forming partial region candidates from the spatial distribution of the local data as described above will be explained below. Note that two types of methods will be explained as the method of forming partial region candidates in step S303.

The first method of forming partial region candidates is a method of forming partial region candidates based on the density of local data in a predetermined range. In this method, an image is searched by a window having a preset size, and a region where the density (or the number) of local data contained in the window is equal to or larger than a predetermined value is extracted as a partial region candidate. As shown in FIG. 4B, this process can extract a partial region where the density of local data is high. As the search window, a plurality of windows having different sizes and aspect ratios are prepared, and a region where the density of local data is high is searched for by sequentially applying these windows. By thus performing searching by using a plurality of windows, it is possible to extract partial region candidates of rectangular regions having various sizes and aspect ratios. Note that the shape of the search window is not limited to a rectangular shape, and may also be another shape such as a circular shape.

In addition, a minimum search window size can be an image size necessary for learning. For example, when an image including 256×256 pixels is necessary for learning of a discriminator, a minimum search window size is a size having 256×256 pixels or more. On the other hand, when applying a search window having a size of 256×256 pixels or more, a partial region including 256×256 pixels or more is extracted. When using a partial region like this as learning data after labeling is performed on the partial region, an image having a size of 256×256 pixels can be cut out from the partial region and used as learning data.

Also, when a region where the density of local data in the window is equal to or larger than a predetermined value is extracted as a partial region candidate, windows having different sizes may overlap each other, or adjacent windows may overlap each other depending on the search step widths of the windows. If overlapped regions are extracted as partial regions, inputting a label to the same image region a plurality of times is a waste in terms of labeling work. In this case, therefore, a partial region candidate is formed by leaving a representative window behind from the overlapped windows.

Figure 5A:
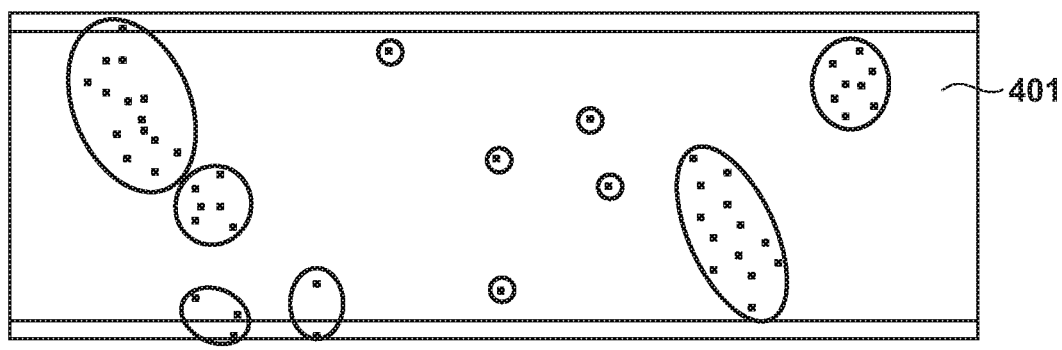
FIG. 5A is a view for explaining a method of setting partial regions by clustering of local data according to the first embodiment.

The second method of forming partial region candidates is a method of forming partial region candidates by clustering the distribution of local data. As the clustering of local data, a method such as mean shift clustering can be used. However, the clustering method is not limited to mean shifting clustering and can be any clustering method. Well-known techniques can be used as these clustering methods, so a detailed explanation thereof will be omitted. FIG. 5A shows the result of clustering of the local data distribution shown in FIG. 4A.

Figure 5B:
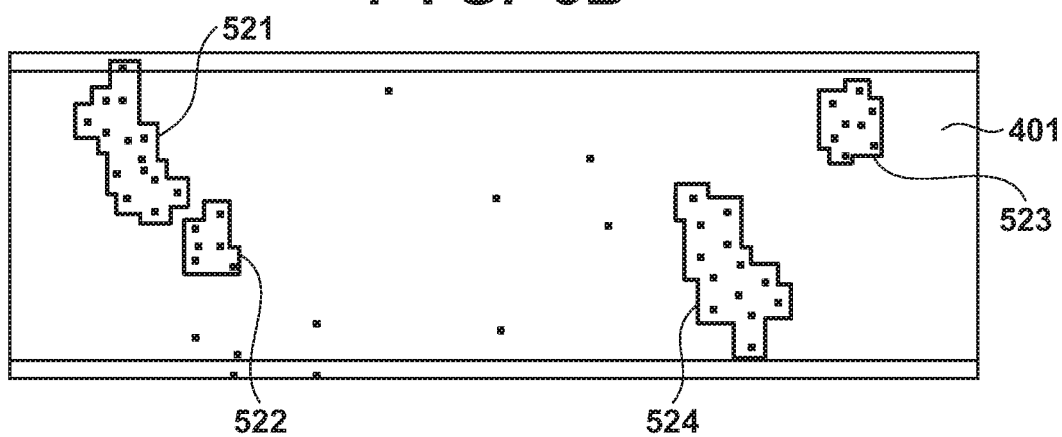
FIG. 5B is a view for explaining a method of setting partial regions by clustering of local data according to the first embodiment.

A method of forming partial region candidates from the clustering result is performed as follows. First, a cluster in which the number of local data is equal to or smaller than a predetermined value is removed from clusters. Then, the range of partial region candidates is determined in each of the remaining clusters. The range of partial region candidates can be determined by setting a rectangular region having a range surrounding local data belonging to the cluster. As another method, a region having an arbitrary shape can be set as a partial region candidate based on the positions of local data belonging to the cluster. FIG. 5B shows the way partial region candidates 521, 522, 523, and 524 having arbitrary shapes are formed from the clusters shown in FIG. 5A based on the positions of local data.

In step S303, partial region candidates are formed by the methods as described above. Processes in subsequent steps S304 and S305 are processes in which the partial region determination unit 103 calculates the priorities of partial region candidates, and selects M upper partial region candidates having high labeling priorities as partial regions. If the number of partial region candidates formed in step S303 is 1 or very small, it is also possible to omit the processes in steps S304 and S305, determine all partial region candidates as partial regions, and perform a labeling process (to be described later).

On the other hand, if the number of partial region candidates is large, partial regions to be actually labeled are set by decreasing the number of partial region candidates, in order to perform efficient labeling. One method of decreasing the number of partial region candidates is a method of selecting partial regions at random from the partial region candidates. In this embodiment, the processes in steps S304 and S305 are performed in order to select more effective labeled data by selecting a partial region candidate that is potentially highly effective for learning. Details of each process will be explained below.

<Step S304>

In step S304, the partial region determination unit 103 calculates the priority of labeling for each of the M partial region candidates determined in step S303. Assume that a partial region candidate having a higher priority value is a region more effective for learning. The priority can be calculated by, for example, the following method.

First, the priority can be set based on the density or number of local data contained in a partial region candidate. Letting $s_1$ be the priority of a partial region candidate $r_m$ based on the density of local data, $s_1$ can be represented by equation 4 below:

$$s_1 = \frac{N(r_m)}{A(r_m)} \quad (4)$$

where $N(r_m)$ is the number of local data contained in the mth partial region candidate $r_m$, and $A(r_m)$ is the area of the partial region candidate $r_m$. Thus, a partial region candidate in which the density of local data is high has a high labeling priority because the pixel of local data is a pixel effective for learning.

In the explanation of step S302, the importance is calculated for each local data. The priority of a partial region candidate can also be calculated by using this importance. More specifically, a statistic such as the sum total or average of the importances of local data contained in the partial region candidate $r_m$ is calculated as the priority of the partial region candidate $r_m$. Equation 5 indicates an example of calculating priority $s_2$ by using the sum total of importances g of local data contained in the partial region candidate $r_m$.

$$s_2 = \sum_{n \in r_m} g_n \quad (5)$$

As another priority setting method, a method of calculating the priority based on the positional relationship between partial region candidates will be explained. Partial regions as labeling targets are desirably collected from various regions in order to form various kinds of learning data. As a method of acquiring various partial regions, there is a method of preferentially selecting partial regions spaced apart from each other. This is based on the assumption that a concrete wall surface image of a structure is an appearance image in which near wall surfaces are similar and distant wall surfaces are different.

In the example of the bridge shown in FIG. 2, the appearances of the slab 201 and the piers 202 and 203 are different. To increase the diversity of partial regions to be selected, therefore, if a partial region is selected from the slab 201, a next partial region is preferably selected from the pier 202 or 203. In addition, even in the slab 201, it is highly likely that the appearances of distant images are more different than those of near images. Thus, to increase the diversity of partial regions to be selected from partial region candidates, partial regions to be selected are combined such that their positions are spaced apart from each other. Note that this positional relationship can be a positional relationship on an image plane, and can also be a three-dimensional positional relationship in a structure.

For example, the method of setting the priority based on the positional relationship can be performed as follows. First, a partial region candidate found to be most important by the priority $s_1$ or $s_2$ is selected as a first partial region from partial region candidates. Then, the distances between the first partial region and the remaining partial region candidates are calculated, and a partial region candidate farthest from the first partial region is selected as a second partial region. Furthermore, the distances between the remaining partial region candidates and the first and second partial regions are calculated, and a partial region candidate having the largest sum total of the distances from the first and second partial regions is selected as a third partial region. Fourth and subsequent partial regions are selected by repeating this processing. Consequently, the partial region candidates are sorted in the descending order of the distance between the positions.

Priority $s_3$ based on the positional relationship is set in each partial region candidate in accordance with the order of sorting (so that the numerical value decreases in the order of sorting). Note that when selecting a partial region from partial region candidates based on only the positional relationship, the M upper partial region candidates can also be selected as partial regions in the order of sorting.

The priority can be calculated by the method as described above, but the priority calculation method is not limited to this, and another calculation method can also be used as long as the labeling priority of a partial region candidate can be evaluated by the value. In addition, the method of calculating the three kinds of priorities $s_1$ to $s_3$ has been explained, but one of these priorities can be calculated as priority S, or the priority S can be calculated as indicated by equation 6 below by combining priorities calculated by a plurality of methods:

$$S = \sum_j w_j s_j \qquad (6)$$

where $w_j$ is the weight of priority $s_j$. The priority S can be obtained by integrating the weighted priorities.

As one priority calculation method, the method of evaluating the diversity of partial region candidates based on their positional relationships has been explained, but the diversity evaluation method is not limited to this. For example, it is also possible to evaluate the similarity between image feature amounts of partial region candidates, and calculate the priorities or sort the partial region candidates so as to select various partial regions.

<Step S305>

In step S305, the partial region determination unit 103 determines partial regions by selecting them from partial region candidates based on the priorities calculated in step S304. As the method of determining partial regions from partial region candidates based on the priorities, it is possible to sort the partial region candidates in the order of priorities, and select the M upper partial region candidates as partial regions. It is also possible to select a partial region candidate representing priority equal to or larger than a predetermined threshold as a partial region without limiting the number of partial regions to be selected to M.

Figure 4C:
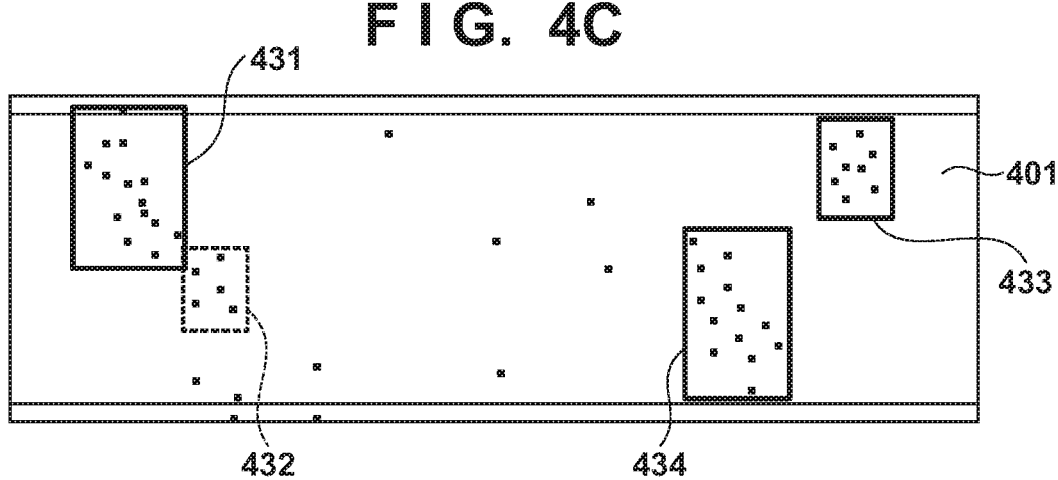
FIG. 4C is a view for explaining local data and partial regions according to the first embodiment.

FIG. 4C shows the way partial regions 431, 433, and 434 are selected from the partial region candidates 421, 422, 423, and 424 in FIG. 4B by the process in step S305. Note that a partial region candidate 432 indicated by the dotted lines is not selected as a partial region because the priority is low.

Then, the display control unit 104 displays the determined partial regions on the display unit 105. Subsequently, the user labels the partial region by using the label input unit 106. In this embodiment, an example in which the display unit 105 is a display and the label input unit 106 includes a keyboard and a mouse will be explained. However, the present invention is not limited to this, and another arrangement may also be adopted. For example, the label input unit 106 can also be a pen tablet, or the display unit 105 and the label input unit 106 can also be integrated into a tablet with a touch panel. The operations of the display unit 105 and the label input unit 106 will be explained below.

FIG. 6 is a view for explaining a Graphical User Interface (GUI) to be displayed on the display unit 105 in order to perform labeling. First, a window 600 of a GUI application displays an image 601 as a labeling target. The image 601 is an image showing a part of the slab 201 of FIG. 2 in an enlarged scale. The application window 600 of the GUI displays an image 602 of the whole slab 201, and also displays a display range 603 of the image 601 by the dotted lines. This allows the user to easily recognize a part of the whole image of the slab 201 which he or she is viewing. In addition, the image 602 of the whole slab 201 displays a partial region (for example, a solid-line rectangle 634) set by the above-described process. The image 601 as a labeling target also shows a partial region 633, and the user performs labeling in this image range.

When the GUI application is activated, a partial region is set, and it becomes possible to start labeling, the image 601 displays an image range including the partial region. The image 601 shown in FIG. 6 displays the partial region 633 in the center. By using this display state as an initial state, the user can view the image by freely moving the display position and enlarging or reducing the image.

The partial region 633 is displayed by the rectangular line in the image 601 of FIG. 6, but the partial region display method is not limited to this. For example, it is also possible to recognizably display the partial region by covering an image region outside the rectangular range with a semitransparent mask. In addition, the partial region is presented as a range in which labeling is recommended, but it is also possible to allow the user to intentionally change the position and size of the partial region. For example, FIG. 6 shows triangular icons 611 or the like for changing the size of the partial region. The user can, for example, extend the partial region size to the right side by dragging the icon 611 to the right.

The user can reduce the input work by decreasing the partial region size. The user can also form more labeled data by increasing the size and extending the labeling range to the periphery of the partial region.

FIG. 6 can also emphatically display the position of local data such as a pixel 612 in addition to the display of the partial region 633. Since local data is a portion important for learning of a discriminator, the user desirably performs labeling very carefully. By thus emphatically displaying the pixel of local data, therefore, it is possible to draw user's attention when he or she performs labeling.

The method of emphatically displaying local data can be any method. For example, the pixel of local data can be displayed with a conspicuous color such as red. Since, however, a labeling target pixel cannot be seen in this emphatic display, it is also possible to use, for example, a display method of blinking the display at a predetermined interval, a display method that allows the user to switch "display" and "non-display" of the emphatic display, or a semitransparent display method. If the visibility is insufficient when only the pixel of local data is emphatically displayed, it is also possible to emphatically display a predetermined range containing the pixel of local data in the center. Furthermore, local data to be labeled with care can emphatically be displayed by a display method such as a method of enclosing the local data portion with a circle, or a method of indicating the local data portion by an arrow.

FIG. 7 shows the way a crack label is input in the partial region 633. The user inputs a crack label 711 to a crack pixel in the image by moving a mouse cursor 710. More specifically, the crack label is input to the position of a crack by dragging the mouse (moving the mouse while pushing it) in the position of a pixel supposed to be a crack. Also, the user must confirm that a pixel to which no crack label is input is not a crack but a normal concrete wall surface. This is equivalent to inputting a non-crack label to an image to which a crack label is not attached. When all cracks in the partial region are labeled, labeling to the partial region is complete.

Note that the emphatic display of local data may also be erased in accordance with the label input state. In this example shown in FIG. 7, when a label is input to the crack 711, the emphatic display of local data of the pixel to which the label is input, or of a pixel near the label, is terminated. In FIG. 7, local data 712 or the like is local data for which emphatic display is terminated when the crack label 711 is input. By thus terminating the emphatic display of local data when the label is input, the user can confirm the progress of labeling input. The emphatic display of local data need not always be terminated when the label is input, and it is also possible to allow the user to intentionally terminate the emphatic display of individual local data. For example, the user can terminate the emphatic display of individual local data by using a tool for erasing (terminating) the emphatic display of local data in a predetermined range, like an eraser tool of paint software. By using the tool like this, the user terminates the emphatic display of local data if he or she thinks that the local data is not a crack. This allows the user to confirm the progress of determination of the presence/absence of a crack, even for an important portion to which no crack label is input.

As processing of the display control unit 104, the display unit 105, and the label input unit 106 when a crack label is input, it is also possible to automatically change the size of a partial region if the input crack label extends from the range of a partial region. FIG. 8 shows the way the user inputs a crack label 811 so that the label extends from the range of the partial region 633. If an input crack label extends from the range of the partial region 633, the display control unit 104 displays an extended range 810 of the partial region 633 on the display unit 105. The extended range 810 shown in FIG. 8 is displayed by the dotted lines, and is a range obtained by extending the rectangular shape of the partial region 633 to a range including the input crack label 811. Note that the method of determining the extended range is not limited to this method. For example, a range surrounding only the vicinity of the crack label 811 extending from the partial region 633 can also be set as the extended range. The display method may also be a display method other than the method of displaying the extended range by the dotted lines. For example, the extended range can also be displayed by a transparent color.

When displaying the extended range of a partial region, it is also possible to display the extended range immediately after the user inputs the crack label 811 (immediately after the user releases mouse click at the position of a mouse pointer 801), and inquire the user about whether to extend the partial region. The display unit 105 displays the extended range 810, and also displays a dialogue box 820 by which the user gives an instruction to extend the partial region. If the user selects "YES", the range of the partial region to be labeled is extended to the extended range 810. Note that when the partial region is extended, a crack may be missed in an extended portion spaced apart from the input crack. Accordingly, the dialogue box 820 displays a message that alerts missing of a crack in the extended range caused by the extension of the partial region by the user. The method of alert like this is not limited to text display in the dialogue box, and it is also possible to directly display a region to be noted in the image 601.

The example of performing display for region extension at the timing at which a crack label is input to extend from a partial region has been explained above. However, a partial region may also be extended at an arbitrary timing in accordance with a user's instruction. In this case, when the user gives an instruction to extend a partial region, an extended range is determined based on an input crack label extending from the partial region, and the extended range and an inquiry about region extension are displayed.

<Partial Region Display Switching>

Partial region display switching will be explained below by referring to FIG. 6 again. As described previously, when the GUI application is activated and it becomes possible to start labeling, the image 601 displays an image range containing partial regions. As a partial region to be displayed first, a partial region having the highest priority can be displayed. When completing label input to the displayed partial region, the user clicks a "NEXT" button 641. Consequently, the image 601 displays a partial region having the second highest priority, and label input is accepted. Thus, partial regions can be displayed in order based on the priority of each partial region.

In this embodiment, M regions are set as partial regions, and the user desirably labels all the partial regions from the viewpoint of learning data expansion. However, it is also possible to allow the user to stop labeling partial regions halfway by clicking an "END" button 642. In this case, partial regions to which labels are input are data usable in learning.

The display order of partial regions is not limited to the order of priority, and can also be determined by another criterion. For example, partial regions can be displayed from the closest one. More specifically, a partial region having the highest priority is displayed first, and subsequent partial regions are displayed from the one having the shortest distance in an image, or from the one having the shortest three-dimensional distance in a structure. This increases the possibility that similar images are displayed in succession, and makes it possible to reduce the input load of the user. On the other hand, partial regions can also be displayed from the farthest one. When displaying partial regions from the farthest one, labels may be input to various images in the early stages of the partial region display order. Accordingly, diverse labeled data can be formed even if the user terminates label input before completing label input to all partial regions. As described above, the partial region display order can also be determined based on the positional relationships between the partial regions.

Furthermore, it is also possible to allow the user to select an arbitrary order, instead of the order of priority, by which labels are input to partial regions. For this purpose, it is possible to, for example, display a list 651 of a plurality of partial regions, and allow the user to set the label input order of the partial regions.

The user may also select a partial region as a label input target. To this end, it is possible to, for example, display the list 651 of a plurality of partial regions, and delete a partial region to which it is presumably unnecessary to input a label. It is also possible to use a function of accepting an instruction to skip label input to a partial region currently being displayed.

As described above, a crack label can be given to a partial region by the operations of the display control unit 104, the display unit 105, and the label input unit 106. The input labeled data is stored in the data storage unit 101 in association with the image. A new discriminator for crack detection can learn by using the image and the labeled data. The learning unit 108 shown in FIG. 1 performs learning of a crack detection discriminator by using the image and the label data stored in the data storage unit 101, and stores the learned discriminator in the discriminator storage unit 107. Note that the learning unit 108 can perform discriminator learning by using only newly formed labeled data, or by using a data set including the existing labeled data.

By using this new discriminator, it is also possible to set local data and partial regions again, and further request labeling. Local data and partial regions can be set by using a new discriminator by the same method as the method explained so far, except that local data setting in step S302 of FIG. 3 is performed by using the new discriminator.

More specifically, in local data setting using a new discriminator, a hard-to-discriminate pixel is selected as local data by using the new discriminator. After this local data setting, a partial region is set based on the local data distribution and labeling is requested for the partial region, in the same manner as above.

Learning of a discriminator and selection of local data can also be repeated a plurality of times. This repetition of labeling and learning can be performed until there is no pixel which a discriminator hardly discriminates (until there is no more local data to be selected), and can also be terminated by user's decision.

In addition, at the timing at which the user clicks a partial region reset button 652 shown in FIG. 6, it is possible to perform learning of a new discriminator by using partial region labels input until that point of time, and reset local data and partial regions.

Alternatively, learning of a discriminator and update of a partial region can automatically be performed in the background while the user is labeling partial regions.

In this case, it is possible to perform learning of a new discriminator and reset local data and partial regions at a predetermined timing by using partial region data completely labeled until that point of time. The reset partial regions are used to automatically replace a partial region currently being presented to the user, and are sequentially presented as labeled regions to the user. Consequently, a partial region important for learning can dynamically be changed in accordance with the label input state, so a partial region regarded as being difficult to discriminate by the updated discriminator is updated at any time, and presented as a label input region to the user. Accordingly, partial regions can efficiently be labeled.

Modifications of First Embodiment

Modifications of the first embodiment will be explained below. The labeling target image of the first embodiment is a structure image pasted on a plan view as shown in FIG. 2, but the labeling target image is not limited to this. For example, an image data set including a plurality of snap images may also be used as labeling target data. In this case, the processes of the local portion setting unit 102 and the partial region determination unit 103 are performed on each image of the image data set, and a partial region as a labeling target is determined from each of the plurality of images. The display control unit 104, the display unit 105, and the label input unit 106 sequentially present the partial regions set in the plurality of images to the user, thereby performing label input to the partial regions.

In addition, the discrimination target of the first embodiment is a crack on the concrete wall surface, but the discrimination target is not limited to this. For example, this embodiment is also applicable to a case of a defective region in inspection of parts, and a case requiring a label for each pixel, such as semantic segmentation of an image or object contour extraction. Furthermore, the label of the first embodiment is a 2-class label indicating whether each pixel is a crack, but the label may also be a multi-class label. In semantic segmentation, for example, pixels are discriminated to multiple classes such as a sky region, a tree region, a ground region, and a person region. Therefore, a multi-class label must be used as label data. This embodiment is also applicable to multi-class labeling like this.

Second Embodiment

In the first embodiment, the example in which local data is a pixel has been explained. However, local data is not limited to a pixel. In the second embodiment, a case in which local data is a region including at least a plurality of pixels will be explained. In the second embodiment, local data will be called a local region. This local region is narrower than a partial region to be presented as a labeling target region to the user. Also, in the second embodiment, a method of selecting local data (a local region) by a method different from that of the first embodiment will be explained. Other processes can be executed by the same processes as in the first embodiment, so an explanation thereof will be omitted. In addition, an apparatus arrangement is the same as that of the first embodiment, so an explanation thereof will be omitted.

Figure 9A:
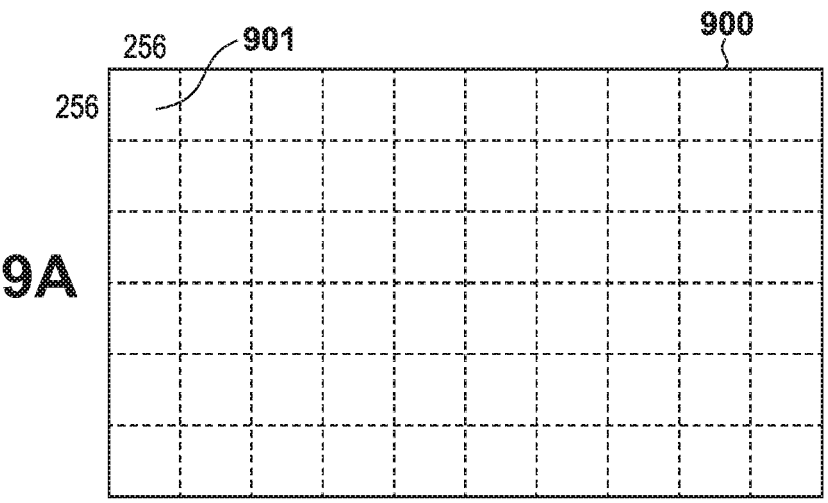
FIG. 9A is a view for explaining local data and partial regions according to the second embodiment.
Figure 9B:
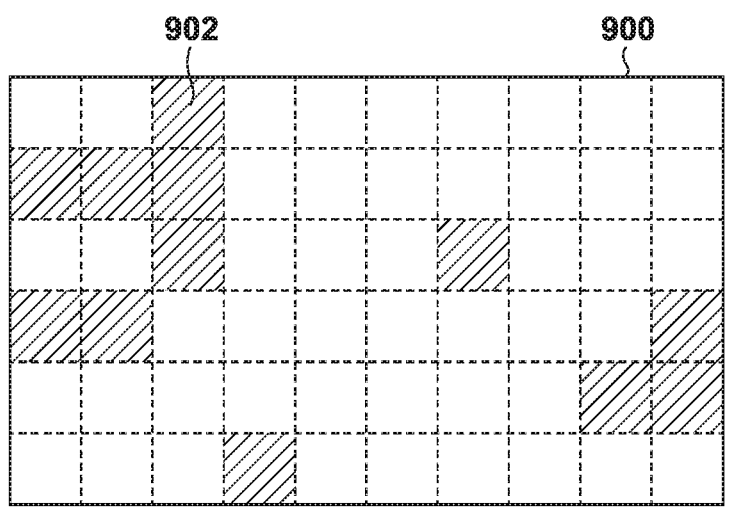
FIG. 9B is a view for explaining local data and partial regions according to the second embodiment.
Figure 9C:
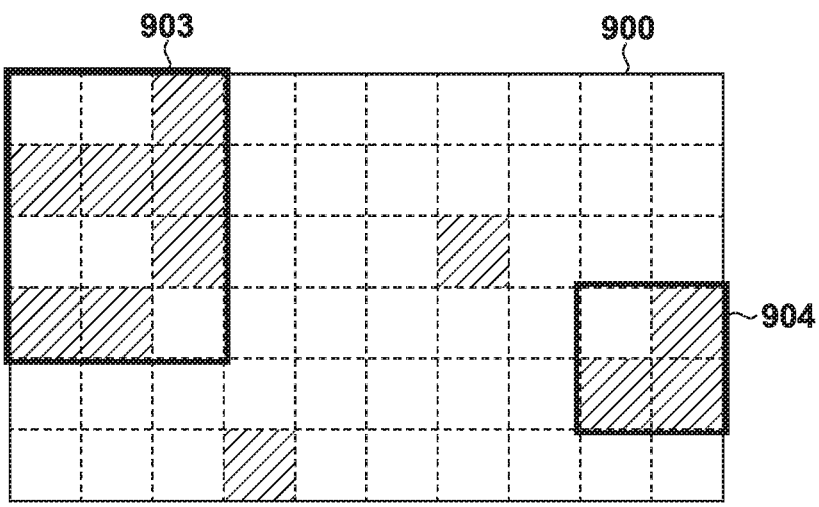
FIG. 9C is a view for explaining local data and partial regions according to the second embodiment.

First, a method of selecting local data (a local region) according to the second embodiment will be explained with reference to FIGS. 9A to 9C. In FIG. 9A, an image 900 is a labeling target image. Assume that the image 900 is segmented into regions each having a size of 256×256 pixels like a patch 901. In the second embodiment, whether to select each patch as a labeling target local region is determined. Note that in order to simplify the explanation, an embodiment that determines whether to select a patch partitioned by a grid as a local region will be explained. However, a region for local region determination is not limited to this. For example, a patch for local region determination can also be obtained from an image so that a plurality of patches overlap each other. In addition, the patch size is not limited to a size of 256×256 pixels, and may also be another size or another aspect ratio.

In this embodiment, a local portion setting unit 102 determines whether an image of each patch is an unknown image of an unknown type not contained in the existing learning data, and, if the image is an unknown image, determines that the image requires labeling, and selects the patch as a local region. This is based on the idea that an image similar to an image of the existing learning data can be processed by learning using the existing data, but an unknown image not contained in the existing learning data should be labeled anew and added to the learning data. To determine whether each patch is an unknown image, an unknown image discriminator is prepared by using the existing learning data. When a patch image is input, this discriminator calculates the similarity to or the divergence from the existing image data set. A patch having similarity equal to or smaller than a predetermined value, or a patch having a divergence equal to or larger than a predetermined value, is regarded as an unknown image, and selected as a local region. The method of obtaining the similarity or divergence of given data with respect to a data set can be implemented by various well-known methods, so any method can be used as the discriminator.

In this embodiment, a discriminator for calculating the divergence will be explained as an example of the discriminator. First, a patch is obtained from an image of the existing learning data set, and an image of the patch is converted into a predetermined feature amount. This feature amount is, for example, a feature representing the atmosphere or feature of the image, and a method such as an auto encoder can be applied. This feature extraction is performed on a group of patches obtained from an image of the existing learning data set, thereby obtaining the feature amount of the existing learning data set. The divergence can be calculated based on the distribution of this feature amount in a feature space.

More specifically, a feature amount is extracted from a patch image as a determination target, and the distance between the feature amount of the patch image and the feature amount distribution of an image of the existing learning data set is calculated as the divergence. The distance from the feature amount distribution can simply be a Euclidean distance from the distribution center, and can also be a Mahalanobis distance by taking the distribution into consideration.

By the above processing, the divergence from the existing learning data set is selected as a local region. In FIG. 9B, hatched patches such as a patch 902 are patches set as local regions. The next processing after the local regions are set is a process of determining a partial region based on the distribution of the local regions by a partial region determination unit 103, and this process can be performed by the same method as that of the first embodiment. For example, FIG. 9C shows a state in which partial regions 903 and 904 are set by a method of setting, as a partial region, a range in which the density of local regions (local data) is equal to or larger than a predetermined value. In this partial region setting process, it is possible to form partial region candidates and select a partial region from the partial region candidates, in the same manner as in the first embodiment.

It is also possible to set the importance of a local region based on the similarity of the divergence. For example, the higher the divergence, the more important a local region as a labeling target. As in the first embodiment, this importance can be used as a criterion for selecting a partial region from partial region candidates including local regions.

In processing after the partial region is set, the user is requested to label the partial region by a display unit 105 and a label input unit 106 in the same manner as in the first embodiment.

Third Embodiment

Labeling target data is an image in the first and second embodiments, but labeling target data is not limited to an image. In the third embodiment, an example in which labeling target data is a moving image will be explained.

An embodiment in which labeling target data is a moving image will be explained below with reference to FIG. 10. For example, one frame of a moving image is local data, and a plurality of consecutive frames containing the local data are partial regions of labeling target data. In this embodiment, labeled data for performing learning of a discriminator for person detection is formed from moving image data of labeling target data.

A discriminator, however, to be applied to a moving image is not limited to this, and any discriminator can be a target. For example, it is also possible to form labeled data for performing learning of a discriminator for detecting abnormality in a moving image. Also, a discriminator for discriminating a plurality of consecutive frames such as a discriminator for discriminating a human action can be a target. In this case, consecutive short frames indicating a human action are local data, and consecutive frames containing the local data and longer than the frames of the local data are consecutive regions.

Figure 10:
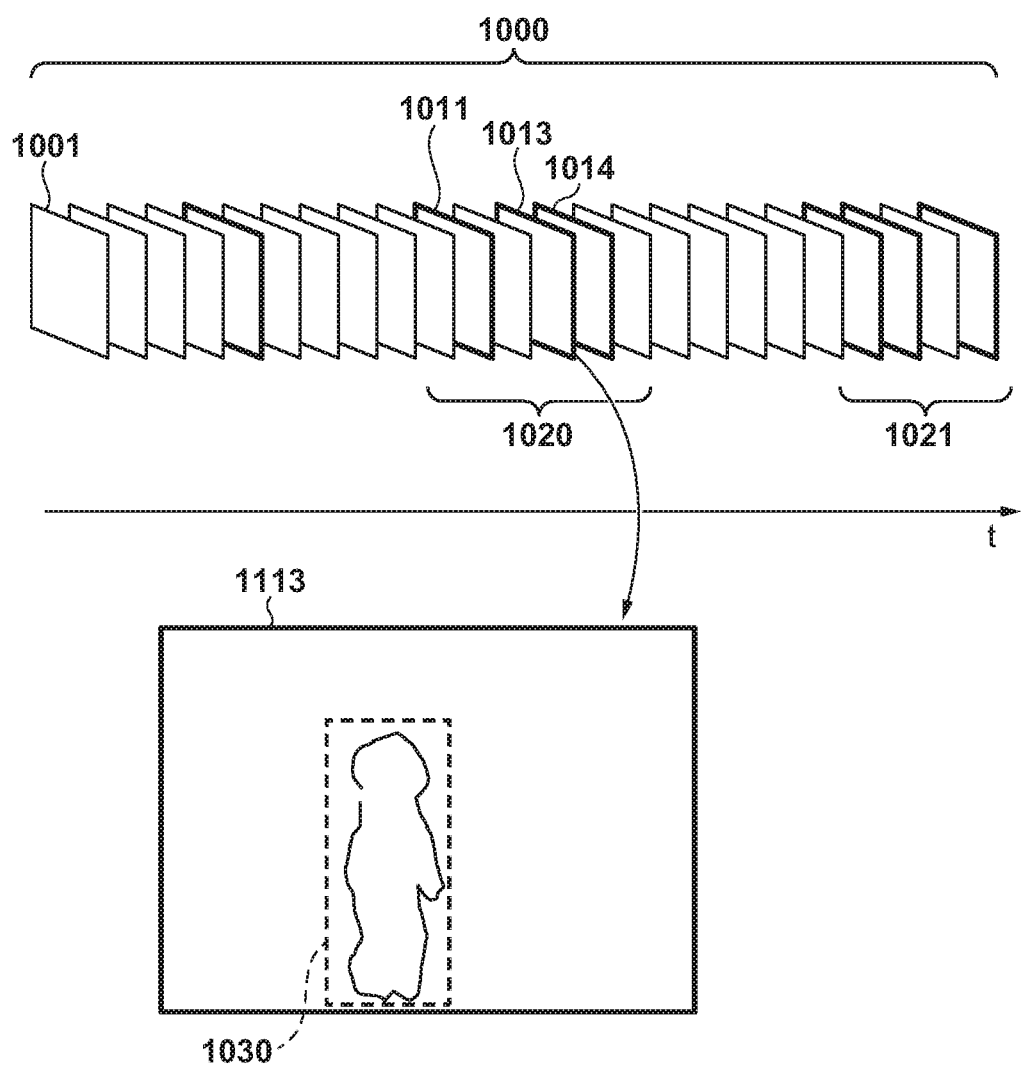
FIG. 10 is a view for explaining local data and partial regions according to the third embodiment.

FIG. 10 shows a moving image 1000 as labeling target data. The moving image 1000 includes frame images such as a frame 1001. First, a local portion setting unit 102 applies a learned discriminator for person detection to the moving image 1000 as labeling target data. By using this discrimination result, the existing discriminator determines hard-to-discriminate local data, in the same manner as in the first embodiment. For example, an image 1113 indicates a person detection result 1030 in an image of a frame 1013. Assume that the person detection result 1030 indicates a result near the discrimination plane of the existing discriminator and is a result which the existing discriminator hardly discriminates. A frame including a result which the existing discriminator hardly discriminates as described above is local data. The moving image 1000 indicates a frame of local data containing a hard-to-discriminate detection result, such as frames 1011, 1013, and 1014, by the thick lines. As described above, the local portion setting unit 102 sets a frame of a moving image of labeling target data as local data.

Then, a partial region determination unit 103 selects a labeling target partial region based on the temporal distribution of the local data. More specifically, consecutive frames in which the density of the local data is high on the time axis of the moving image are set as partial regions. FIG. 10 shows the way consecutive frames 1020 and 1021 are selected as partial regions.

The user inputs a label indicating the position of a person to each of the consecutive frames by using a display unit 105 and a label input unit 106. The person position label is, for example, rectangular information indicating a person position range in a frame image. By this operation, data for performing learning of a discriminator for person detection can be formed. When labeling consecutive frames, the way a person looks does not largely change between the frames. Accordingly, there is a case in which when a person position label is input to a given frame, the same label can be applied to consecutive frames. In addition, when person position labels are input to, for example, the frames 1011 and 1013, a person position label of a frame between them can be estimated from the person position labels of the frames 1011 and 1013. Thus, a function of supporting label input of consecutive frames can be given to the display unit 105 and the label input unit 106. By selecting partial regions of consecutive frames as labeling target data and using the label input support function as described above, many labeled data can be formed by a low work cost.

By the method as described above, a moving image can be used as labeling target data. However, labeling target data is not limited to moving image data and may also be time-series data such as sensor data. For example, labeling can be performed on unlabeled time-series sensor data in order to perform learning of a discriminator for detecting abnormality from a plurality of sensor data. In this case, sensor data at the timing which a discriminator hardly discriminates is selected as local data from among the plurality of sensor data.

Furthermore, when using multimodal data such as a plurality of sensor data, a partial region can be set based on the distribution of local data in a multi-dimensional space or a feature space of the data. This partial region contains a group of similar data near the local data, so the local data supposed to be effective for learning and the group of similar data can be selected as labeling target data.

Fourth Embodiment

In the above embodiments, the examples in which a plurality of local data are set and a partial region is set based on the distribution of the local data have been explained. In the fourth embodiment, an example in which a partial region is set based on one local data will be explained. In this embodiment, a range is extended based on the position of one given local data, and a peripheral region containing the local data is set as labeling target data. In this data, the local data setting method can be performed by the same methods as those of the above-described embodiments. Therefore, a process by which a partial region determination unit 103 determines a partial region in a state in which local data is selected will be explained below.

The method of determining a peripheral region by extending a range based on local data can be a method by which a predetermined range centering around local data is set as a peripheral region. For example, FIG. 11A shows the way a peripheral region having a predetermined size is set as a partial region 1111 around local data 1110 as the center. The user performs labeling in the partial region 1111 in the same manner as in the first embodiment. Also, a partial region set by the partial region determination unit 103 is an initial value, so the user can adjust the position and size of the partial region 1111 by using a display unit 105 and a label input unit 106.

Figure 11B:
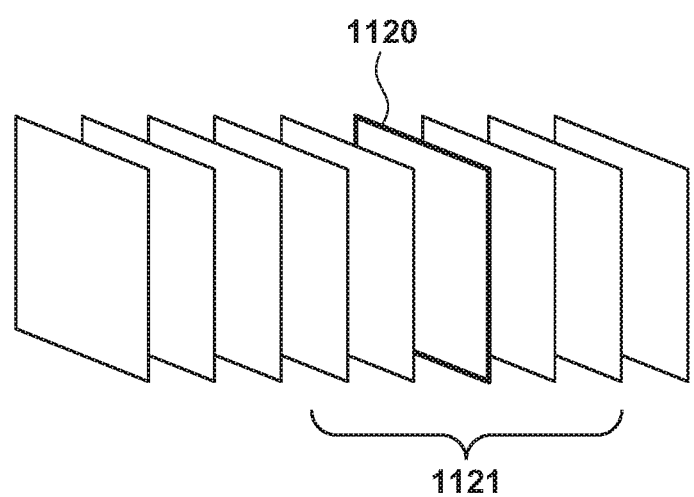
FIG. 11B is a view for explaining local data and a partial region according to the fourth embodiment.

FIG. 11B is a view for explaining processing when moving image data is labeling target data. In FIG. 11B, a frame 1120 is local data, and the range of a predetermined number of frames before and after the frame 1120 is a peripheral region. As a consequence, a range 1121 of the peripheral region is a partial region.

The method of setting a partial region based on one local data has been explained above. However, a partial region may also be set by combining one local data with another information. For example, it is also possible to evaluate the continuity or the similarity between a pixel of one local data and an image around the pixel, and set a range similar to the pixel of the local data as a partial region. Likewise, when using a moving image, the range of consecutive frames having images similar to that of a frame of local data, or the range of consecutive frames supposed to be the range of the same scene as that of the local data frame, can be set as a partial region.

Fifth Embodiment

In the above embodiments, the examples in which a portion effective for learning is determined and local data is set based on the discrimination result of the existing discriminator or on the similarity or the divergence with respect to the existing data set have been explained. In the fifth embodiment, an example in which local data is set based on a criterion different from those described above will be explained.

In the above-described embodiments, a region where the distribution density of local data is high or a region clustered based on the distribution of local data is set as a partial region. In this embodiment, as a method of setting a partial region based on the distribution of local data, a method of setting the existing range of local data as a partial region will be explained. Note that this embodiment will be explained by taking crack detection of a concrete wall surface image as an example as in the first embodiment.

First, a local data setting method according to the fifth embodiment will be explained below. Local data is obtained by determining a data portion effective for learning by a given criterion. For example, a discriminator for crack detection performs learning for discriminating whether an edge portion in an image is a crack or an edge other than a crack, so an edge portion of an image is a portion important for learning in crack detection. Accordingly, a portion effective for learning can be determined by extracting an edge portion of an image by image processing or the like. As a method of the image processing for edge extraction, well-known methods such as differential filter processing and threshold processing can be used. It is also possible to convert an image into frequency components, and extract an edge by a process of leaving only a high-frequency-component region behind. In the fifth embodiment, an edge pixel extracted as described above is set as local data.

The setting of local data by edge extraction is a local data setting method effective when performing learning of a discriminator whose task is crack detection or contour extraction. A local data setting method like this can be set in accordance with the task of a discriminator as a target of learning. For example, to form labeled data of a sky region in image region segmentation, a blue pixel can be extracted as local data. Alternatively, as a versatile local data setting method, there is a method by which the user designates a data portion to be determined as effective for learning from labeling target data, and data portions similar to the designated data portion are collected. Specific examples are a method of collecting pixels having a pixel value similar to that of a pixel designated by the user, and a method of performing pattern matching based on an image patch designated by the user and collecting similar image patch portions.

A partial region setting method according to the fifth embodiment will be explained below. In the fifth embodiment, a partial region is a region surrounding all positions in each of which local data exists. A partial region may also be a range surrounding all local data set by the above-described processing. Alternatively, it is also possible to automatically or manually remove local data that is spatiotemporally an outlier, and set a range surrounding all local data as a partial region. Furthermore, a shape surrounding local data can be a rectangular shape, and can also be an arbitrary shape as shown in FIG. 5B of the first embodiment.

Modifications of Fifth Embodiment

As a modification of the fifth embodiment, an example using a plurality of local data setting methods together will be explained below. In the above examples, local data setting methods such as the local data setting method using the differential filter processing and the threshold processing and the local data setting method of extracting a high frequency component have been explained. By setting local data by using the plurality of methods as described above together, various kinds of local data can be set. Note that the local data setting methods to be used together can include the local data setting method using a discriminator in the first embodiment and the like.

FIG. 12 shows the way partial regions are set by using a plurality of local data setting methods together. In this example shown in FIG. 12, local data setting methods A and B are used together. Circles 1210 shown in FIG. 12 are the pixels of local data set by the local data setting method A. A range 1211 surrounding these local data is a partial region set based on the distribution of the local data of the local data setting method A. On the other hand, x marks 1220 are the pixels of local data set by the local data setting method B. A range 1221 surrounding these local data is a partial region set based on the distribution of the local data of the local data setting method B. Partial regions having different characteristics can be set by thus using a plurality of local data setting methods together. Note that in FIG. 12, the user can freely adjust the positions and sizes of the presented partial regions 1211 and 1221 in the same manner as in the above-described embodiments.

It is also possible to allow the user to select a local data setting method from a plurality of local data setting methods. For this purpose, local data set by local data setting methods or partial regions formed by the local data are displayed so that the user can compare them. The user checks the display and selects a local data setting method corresponding to local data or a partial region regarded as appropriate as a labeling target. To perform these processes, it is also possible to enable the display unit 105 and the label input unit 106 to perform a function of displaying the results (local data and partial regions) of a plurality of local data setting methods, and a function of selecting a local data setting method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-036394, filed Feb. 28, 2019, which is hereby incorporated by reference herein in its entirety.

What is claimed is:

1. An apparatus comprising:
one or more processors; and
at least one medium storing instructions to be executed by the one or more processors,
wherein the instructions when executed cause the apparatus to:
obtain target data as a result of discrimination of each portion of input data performed by a discriminator having learned in advance by using existing labeled data;
set each portion of the target data, which is effective for additional learning of the discriminator, as local data;
determine not less than one partial region of the target data, which accepts labeling by a user, based on a distribution of the set local data in the target data; and
display on a display device the determined not less than one partial region.

2. The apparatus according to claim 1, wherein the the instructions when executed further cause the apparatus to narrow down a portion of the target data, which accepts labeling by the user, as the partial region, based on the distribution of the not less than one local data in the target data.

3. The apparatus according to claim 1, wherein the partial region contains a plurality of local data.

4. The apparatus according to claim 1, wherein the not less than one portion of the target data, which is effective for additional learning of the discriminator, is a portion having a feature different from a feature learned by the existing labeled data.

5. The apparatus according to claim 1, wherein the local data is set based on similarity or divergence between the target data and a data set of the existing labeled data.

6. The apparatus according to claim 1, wherein the partial region is determined based on a density of the local data.

7. The apparatus according to claim 1, wherein the distribution of the local data is clustered, and the partial region is determined based on the clustering result.

8. The apparatus according to claim 1, wherein a plurality of partial region candidates are formed based on the distribution of the local data, priority of each of the plurality of partial region candidates is calculated, and the partial region from the partial region candidates is selected based on the priority.

9. The apparatus according to claim 8, wherein the the priority of each of the partial region candidates is calculated based on a density of the local data contained in the partial region candidates.

10. The apparatus according to claim 8, wherein importance of each local data is calculated, and the priority of each of the partial region candidates is calculated based on the importance of the local data contained in the partial region candidates.

11. The apparatus according to claim 1, wherein a plurality of partial region candidates are formed based on the distribution of the local data, and the partial region is selected from the partial region candidates based on a positional relationship of each partial region candidate.

12. The apparatus according to claim 1, wherein priority of the partial region is calculated based on the local data contained in the partial region, and a display order of the partial regions is controlled based on the priority of each partial region.

13. The apparatus according to claim 1, wherein a display order of the partial regions is controlled based on a positional relationship of each partial region.

14. The apparatus according to claim 1, wherein the display device displays a window including a GUI for accepting labeling performed on the partial region by the user.

15. The apparatus according to claim 14, the instructions when executed further cause the apparatus to accept input of labeling, and wherein, if input of labeling exceeding a range of the partial region is accepted, the range of the partial region is extended based on a range of the input labeling.

16. The apparatus according to claim 1, wherein the input data is image data obtained by imaging a structure, and wherein the discriminator discriminates between a portion showing a predetermined defect and a portion not showing the predetermined defect in the image data.

17. The apparatus according to claim 16, wherein the predetermined defect is a crack generated in the structure, and wherein the labeling is a result of clearly showing a pixel indicating a crack in the partial region displayed on the display device.

18. An information processing method to be executed by an apparatus, the method comprising:

obtaining target data as a result of discrimination of each portion of input data performed by a discriminator having learned in advance by using existing labeled data;

setting each portion of the target data, which is effective for additional learning of the discriminator, as local data;

determining not less than one partial region of the target data, which accepts labeling by a user, based on a distribution of the set local data in the target data; and causing a display device to display the determined not less than one partial region.

19. A non-transitory computer-readable recording medium storing a program that, when executed by a computer, causes the computer to:

obtain target data as a result of discrimination of each portion of input data performed by a discriminator having learned in advance by using existing labeled data;

set each portion of the target data, which is effective for additional learning of the discriminator, as local data;

determine not less than one partial region of the target data, which accepts labeling by a user, based on a distribution of the set local data in the target data; and display on a display device the determined not less than one partial region.

* * * * *